(12) United States Patent
West

(10) Patent No.: US 10,926,893 B2
(45) Date of Patent: Feb. 23, 2021

(54) SPACE BASED MAGNETIC VORTEX ACCELERATOR AND METHODS OF USE THEREOF

(71) Applicant: Brandon West, Roswell, GA (US)

(72) Inventor: Brandon West, Roswell, GA (US)

(*) Notice: Subject to any disclaimer, the term of this patent is extended or adjusted under 35 U.S.C. 154(b) by 551 days.

(21) Appl. No.: 16/101,399

(22) Filed: Aug. 11, 2018

(65) Prior Publication Data

US 2019/0135458 A1    May 9, 2019

Related U.S. Application Data

(60) Provisional application No. 62/544,766, filed on Aug. 11, 2017.

(51) Int. Cl.
*B64G 1/40*       (2006.01)
*B64G 1/00*       (2006.01)

(52) U.S. Cl.
CPC ............. *B64G 1/409* (2013.01); *B64G 1/007* (2013.01)

(58) Field of Classification Search
CPC ................................. B64G 1/409; B64G 1/007
See application file for complete search history.

(56) References Cited

U.S. PATENT DOCUMENTS

| | | | |
|---|---|---|---|
| 4,795,113 A | 1/1989 | Minovitch | |
| 4,881,446 A | 11/1989 | Marks et al. | |
| 5,024,137 A | 6/1991 | Schroeder | |
| 5,305,974 A | 4/1994 | Willis | |
| 6,170,404 B1 | 1/2001 | Robertson | |
| 6,311,926 B1 | 11/2001 | Powell et al. | |
| 6,994,296 B2 | 2/2006 | Schubert | |
| 7,444,919 B1 | 11/2008 | Mansfield | |
| 7,762,173 B2 | 7/2010 | Root, Jr. | |
| 8,336,826 B2 | 12/2012 | Janson | |
| 2004/0245407 A1 | 12/2004 | Ausilio et al. | |
| 2005/0077433 A1 | 4/2005 | Schubert | |
| 2007/0234705 A1 | 10/2007 | Emsellem | |
| 2008/0093506 A1* | 4/2008 | Emsellem | H05H 1/54 244/169 |
| 2012/0032029 A1 | 2/2012 | Dee La Peña Llaca | |
| 2018/0362191 A1* | 12/2018 | Russell | B64G 1/002 |

OTHER PUBLICATIONS

International Search Report and Written Opinion dated Oct. 16, 2019 for corresponding PCT Application No. PCT/US2015/046394.

* cited by examiner

*Primary Examiner* — Jessica B Wong
(74) *Attorney, Agent, or Firm* — Mathew L. Grell; Jeffrey C. Watson; Grell & Watson Patent Attorneys LLC

(57) ABSTRACT

A space based magnetic vortex accelerator and methods of use thereof having one or more sections of magnetic material configured as a conduit with a flightpath therethrough for the spacecraft, a magnetic coil field generator electrically connected to said one or more sections of magnetic material configured to generate a space based magnetic field via said one or more sections of magnetic material, a power plant electrically connected to said magnetic coil field generator, said power plant configured to power said magnetic coil field generator, one or more magnetic field receivers affixed to the spacecraft, said one or more magnetic field receivers configured to magnetically engage said space based magnetic field.

13 Claims, 8 Drawing Sheets

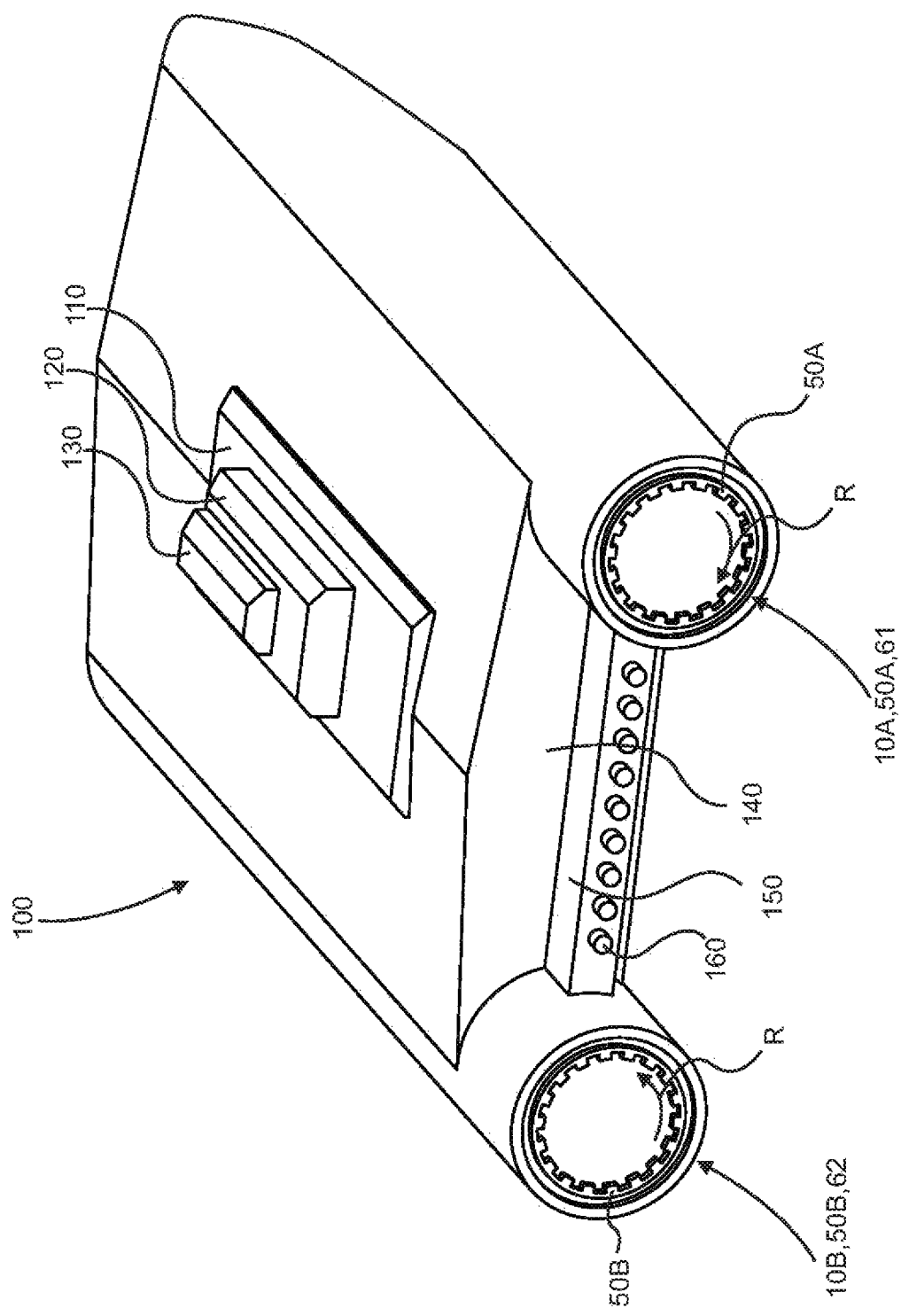

SPACE BASED MAGNETIC VORTEX ACCELERATOR AND METHODS OF USE THEREOF

CROSS-REFERENCE TO RELATED APPLICATIONS

To the full extent permitted by law, the present application hereby claims priority to and the full benefit of U.S. Provisional Application No. 62/544,766, filed on Aug. 11, 2017, entitled "SPACE BASED ACCELERATOR AND METHODS OF USE THEREOF," which is incorporated herein by reference in its entirety.

TECHNICAL FIELD

This disclosure relates to rocketry or spacecraft accelerator system and methods of use thereof. More specifically the disclosure relates to an accelerator to accelerate a spacecraft in zero or low-gravity environment using electromagnetic forces.

BACKGROUND

The current state of the art in spacecraft propulsion utilizes a variety of chemical fuels, either liquid, gas, or solid fuel. Chemically-fueled rockets require that fuel be brought along, and this limits the performance of the spacecraft.

Moreover, space launches utilize parabolic path and hyperbolic path trajectories around concentrated masses, such as stars, planets, and moons and are determined by the gravitational-attraction properties of concentrated masses a projectile is attempting to launch from. These launches are limited to the timing, position, distance, and final destination of the projectile in relation to the concentrated mass used as a launch. The type of path that will be taken up by a projectile, such as a spacecraft starting at a given location will depend upon its velocity. It will take up an open-ended path if its velocity equals or exceeds escape velocity of the concentrated mass; escape velocity is, by definition, that velocity required at a given location to establish a parabolic orbit and is dependent on the mass of the concentrated mass and the trajectory of the projectile.

Some land based approaches to accelerators, include electromagnetic guns, electromagnetic launchers, and mass drivers, utilize electromagnetic propulsion function via an electric current applied to a series of electromagnetic coils spaced at predetermined intervals therein the land based tube and activated just ahead of the center of the vehicle as it advances there through the tube. A projectile made wholly or in part of a magnetic material such as iron; or other known magnetic material is accelerated through the series of electromagnetic coils. Some disadvantages to this approach include the requirement of extreme velocities necessary to achieve escape velocity of planet earth, and the cooling requirements to maintain super conductivity of the storage ring and the series of electromagnetic coils.

A simplified approach to a space based accelerator, utilizes electromagnetic propulsion function via an electric current applied to a series of electromagnetic coils spaced at predetermined intervals therein a space based tube. When the projectile (or another magnetic material) enters the magnetic field, a force is applied to the projectile. The magnitude of the force is determined by the current, the number of winds, the area of the coil, and a number of secondary factors. One disadvantage of this approach is that the space craft does not participate in amplifying the magnitude of the force in the electromagnetic propulsion function.

Therefore, it is readily apparent that there is a need for a space based magnetic vortex accelerator and methods of use thereof that functions to enable a combination of features that is designed to address at least some aspects of the problems discussed above. Moreover, providing a space based accelerator, utilizing electromagnetic propulsion function in combination with a space craft electromagnetic propulsion function.

BRIEF SUMMARY

Briefly described, in an example embodiment, the present disclosure overcomes the above-mentioned disadvantages and meets the recognized need for a space based magnetic vortex accelerator and methods of use thereof, that generally includes one or more sections of magnetic material configured as a conduit with a flightpath therethrough for the spacecraft, a magnetic coil field generator electrically connected to said one or more sections of magnetic material configured to generate a space based magnetic field via said one or more sections of magnetic material, a power plant electrically connected to said magnetic coil field generator, said power plant configured to power said magnetic coil field generator, one or more magnetic field receivers affixed to the spacecraft, said one or more magnetic field receivers configured to magnetically engage said space based magnetic field.

According to its major aspects and broadly stated, the present disclosure in its exemplary form is a space based magnetic vortex accelerator and methods of use thereof, that generally includes one or more sections of magnetic material configured as a conduit with a flightpath therethrough for the spacecraft, a magnetic coil field generator electrically connected to said one or more sections of magnetic material configured to generate a space based magnetic field via said one or more sections of magnetic material, a power plant electrically connected to said magnetic coil field generator, said power plant configured to power said magnetic coil field generator, one or more rotating magnetic vortex devices affixed to the spacecraft, said one or more rotating magnetic vortex devices configured to magnetically engage said space based magnetic field and thus, to provide space based accelerator, utilizing electromagnetic propulsion function in combination with a space craft electromagnetic propulsion function together as space based magnetic vortex accelerator.

In an exemplary embodiment, the space based accelerator system to accelerate a spacecraft in space, the system includes one or more sections of magnetic coils configured as a conduit with a flightpath therethrough for the spacecraft, a magnetic coil field generator electrically connected to the one or more sections of magnetic coils and configured to generate a space based magnetic field therein the flightpath, and a power plant electrically connected to the magnetic coil field generator, the power plant configured to power the magnetic coil field generator.

In an exemplary embodiment, the method of utilizing a space based accelerator system to accelerate a spacecraft in space, the method comprising the steps of providing one or more sections of magnetic coils configured as a conduit with a flightpath therethrough for the spacecraft, a magnetic coil field generator electrically connected to the one or more sections of magnetic coils and configured to generate a space based magnetic field therein the flightpath, a power plant electrically connected to the magnetic coil field generator, the power plant configured to power the magnetic coil field generator, positioning the space based accelerator system in the flightpath of the spacecraft, positioning the spacecraft on a trajectory to enter the space based accelerator system, generating an electromagnetic vortex field therein the space based accelerator, and propelling the spacecraft therefrom the space based accelerator system.

A feature of the space based magnetic vortex accelerator and methods of use is the ability to provide a space based accelerator to accelerate a spacecraft in space. The accelerator would have one or more sections of magnetic material configured as a conduit with a flightpath therethrough for the spacecraft. A magnetic coil field generator would be connected to one or more sections of the magnetic material to generate a space based magnetic field. One or more magnetic field receivers would be attached to the spacecraft and upon entering the magnetic field the spacecraft would be accelerated through space.

Another feature of the space based magnetic vortex accelerator and methods of use is the ability to provide two or more directional thrusters to position the conduit of magnetic material for ingress and egress of the spacecraft and configured to accelerate the spacecraft on a designated trajectory calculated and communicated via navigation guidance system.

Yet another feature of the space based magnetic vortex accelerator and methods of use is the ability to provide two or more space based magnetic vortex accelerators in series to add additional acceleration to the spacecraft.

Yet another feature of the space based magnetic vortex accelerator and methods of use is the ability to provide two or more space based magnetic vortex accelerators in series at a start position and receiving position a far distance apart.

Yet another feature of the space based magnetic vortex accelerator and methods of use is the ability to provide one or more rotating magnetic vortex devices affixed to the spacecraft. The one or more rotating magnetic vortex devices are configured to magnetically engage the space based magnetic field of the one or more sections of magnetic material configured as a conduit to add additional acceleration to the spacecraft.

Yet another feature of the space based magnetic vortex accelerator and methods of use is the ability to provide space based acceleration to a spacecraft rather than planet based.

Yet another feature of the space based magnetic vortex accelerator and methods of use is the ability to provide electromagnetic energy to maneuver a spacecraft, such as accelerate, slow, and/or stop, a spacecraft in low and zero-gravity environments.

Yet another feature of the space based magnetic vortex accelerator and methods of use is the ability to generate a magnetic field in the zero or low-gravity environment.

Yet another feature of the space based magnetic vortex accelerator and methods of use is the ability to change speed and/or trajectory of a spacecraft when moving in proximity to the magnetic-field.

Yet another feature of the space based magnetic vortex accelerator and methods of use is the ability to maneuver or propel a spacecraft exclusively by using electromagnetic forces.

Yet another feature of the space based magnetic vortex accelerator and methods of use is the ability to provide efficient injection and ejection on a designated trajectory.

Yet another feature of the space based magnetic vortex accelerator and methods of use is the ability to provide inexhaustible solar energy, nuclear energy and/or harvest or captured energy from decelerating spacecraft.

Yet another feature of the space based magnetic vortex accelerator and methods of use is the ability to decelerate or accelerate spacecraft.

Yet another feature of the space based magnetic vortex accelerator and methods of use is the ability to force a spacecraft into or out of an orbital path.

Yet another feature of the space based magnetic vortex accelerator and methods of use is the ability to operate in the vacuum of space.

These and other features of the space based magnetic vortex accelerator and methods of use will become more apparent to one skilled in the art from the prior Summary and following Brief Description of the Drawings, Detailed Description of exemplary embodiments thereof, and Claims when read in light of the accompanying Drawings or Figures.

BRIEF DESCRIPTION OF THE DRAWINGS

The present space based magnetic vortex accelerator and methods of use will be better understood by reading the Detailed Description of the Preferred and Selected Alternate Embodiments with reference to the accompanying drawing Figures, in which like reference numerals denote similar structure and refer to like elements throughout, and in which:

FIG. 2A is a rear perspective view of an exemplary embodiment of a dual direction space based magnetic vortex accelerator system, according to FIG. 1;

DETAILED DESCRIPTION

In describing the exemplary embodiments of the present disclosure, as illustrated in FIGS. 1A, 1B, 1C, 2A, 2B, 3, 4A, 4B, and 5 specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples.

Figure 1A:
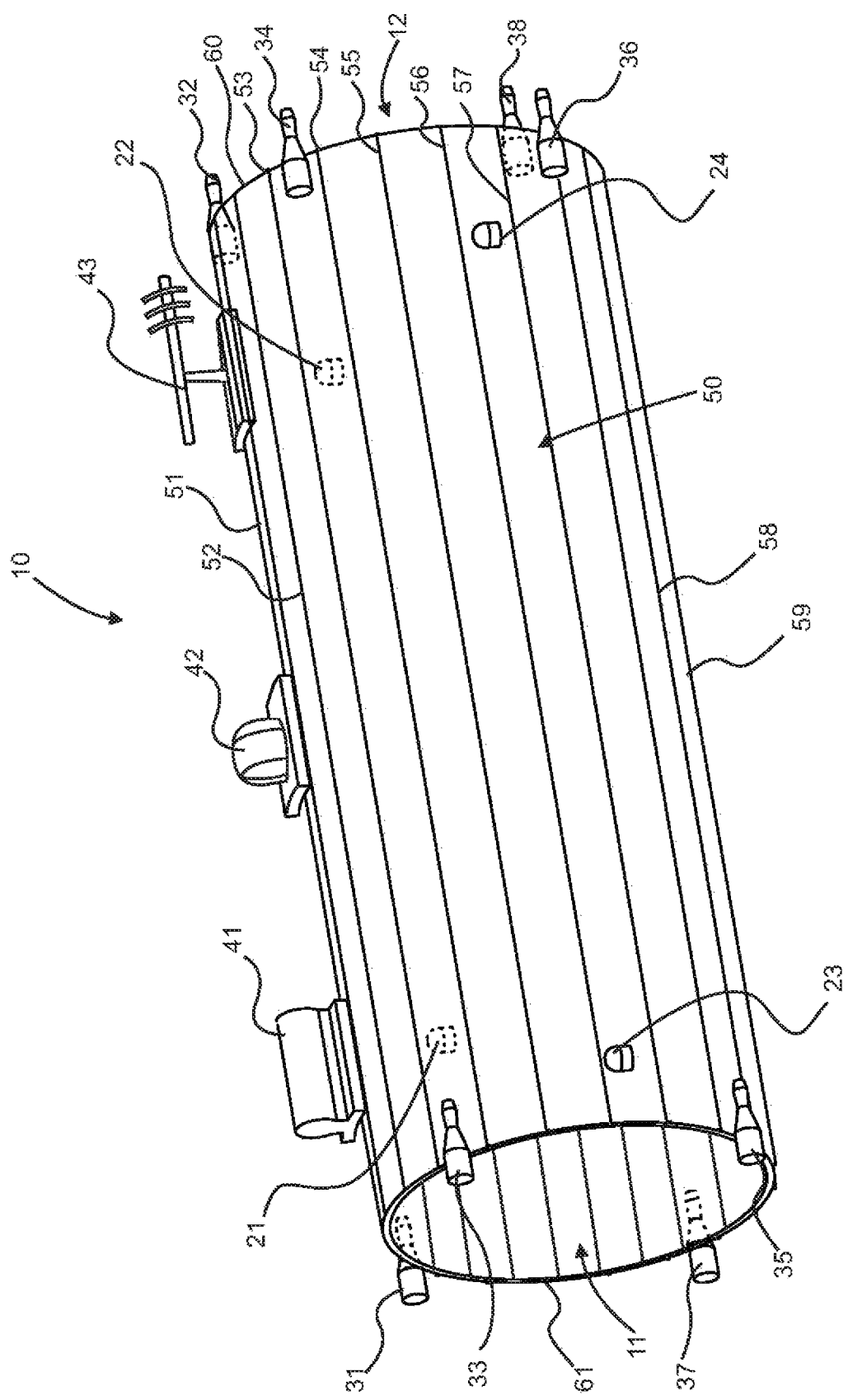
FIG. 1A is a side view of an exemplary embodiment of the space based magnetic vortex accelerator system.
Figure 1B:
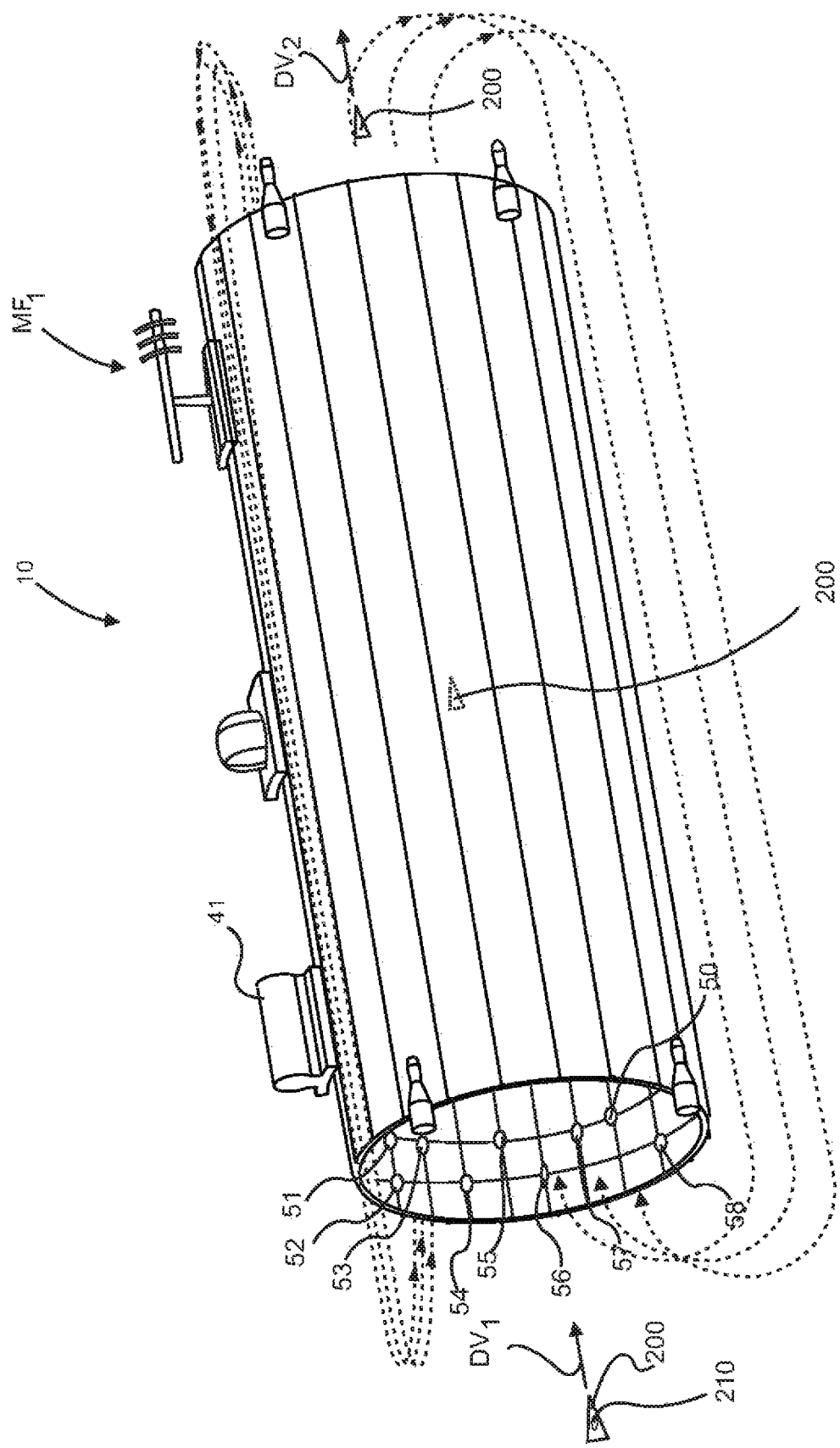
FIG. 1B is a side view of an exemplary embodiment of the space based magnetic vortex accelerator system showing lines of force of its magnetic field, according to FIG. 1.
Figure 1C:
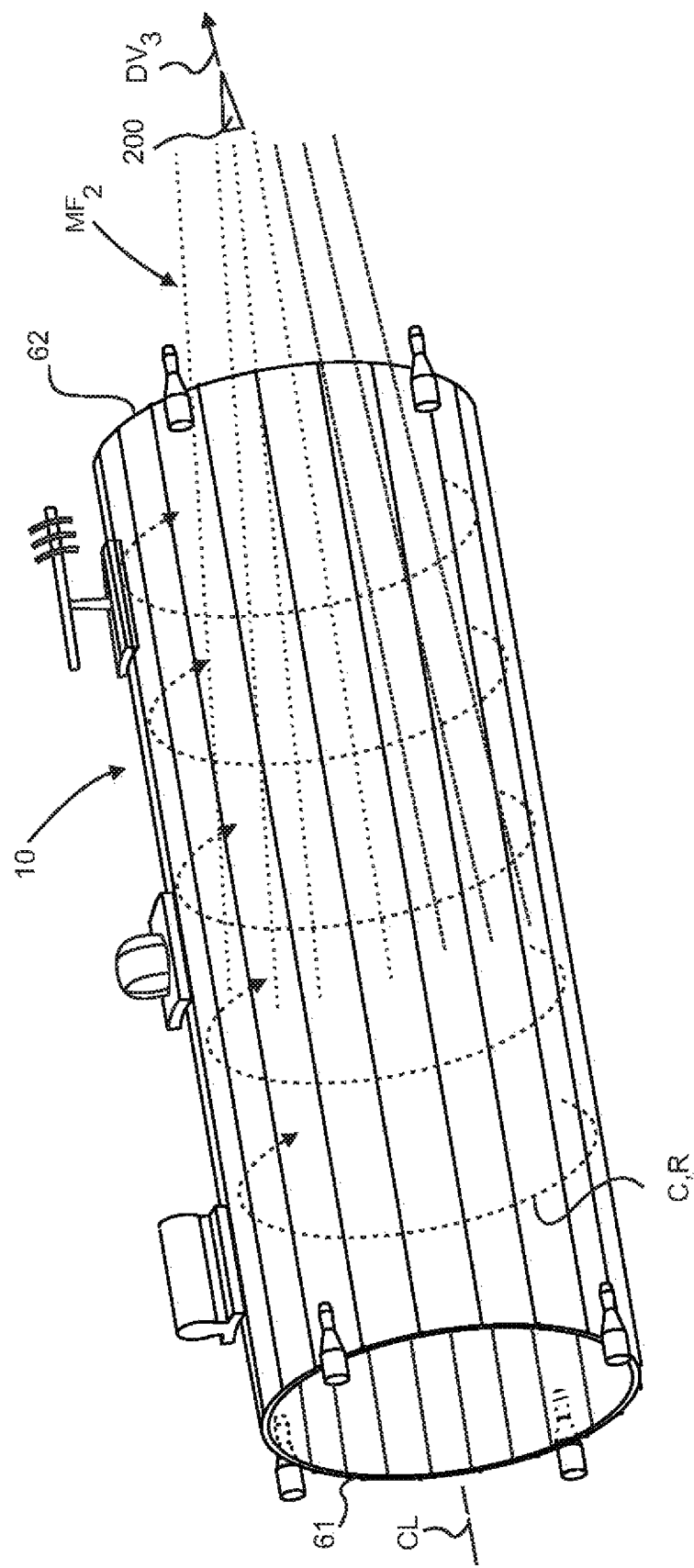
FIG. 1C is a side view of an exemplary embodiment of the space based magnetic vortex accelerator system showing rotational lines of force of its magnetic field, according to FIG. 1.

Referring now to FIGS. 1A, 1B and 1C, by way of example, and not limitation, there is illustrated an example embodiment space based magnetic vortex accelerator system 10. Space based magnetic vortex accelerator system 10 may be configured having one or more magnetic coils, or one or more rotational support sections with electromagnetic drive coils or pulse coils of the electromagnetic accelerator mounted around the internal circumferential periphery of space based magnetic vortex accelerator system 10 as one or more magnetic coils 50 configured substantially as a conduit with end supports, such as first end support 61 and spaced there apart second end support 62 and mounted around its external circumferential periphery. One or more rows of coils or one or more sections of magnetic coils 50 may run or connect or electrically connect there between first end support 61 and spaced there apart second end support 62, such as first magnetic coil section 51, second magnetic coil section 52, third magnetic coil section 53, fourth magnetic coil section 54, fifth magnetic coil section 55, sixth magnetic coil section 56, sixth magnetic coil section 56, seventh magnetic coil section 57, eighth magnetic coil section 58, and ninth magnetic coil section 59.

Space based magnetic vortex accelerator system 10 may further include magnetic coil field generator 42 having electric cables, control circuitry, processors, capacitor bank, roll control system, sensors, vehicle position sensors, and other electrical subsystems that are well known in the art of automatic control systems, and electrically connected to one or more magnetic coils 50, including magnetic coil sections 51-59 to electrify (electrifies) the coils and generate a space based magnetic field therein one or more magnetic coils 50 configured substantially as a conduit. Moreover, space based magnetic vortex accelerator system 10 may further include power plant 41, such as a nuclear reactor, solar collection/panel system or other developed power supply electrically connected to magnetic coil field generator 42 and to power magnetic coil field generator 42. Moreover, power plant 41 may include electric cables, control circuitry, switch gear, sensors, and other electrical subsystems that are well known in the art of power control systems.

It is contemplated herein that the electromagnetism principle of the physics of a current passing through (electrifies) one or more magnetic coils 50 produces a space based magnetic field therein a flightpath for forward vehicle thrust or deceleration. The lines of electromagnetic force MF1 generated by one or more magnetic coils 50, including magnetic coil sections 51-59 of space based magnetic vortex accelerator system 10 in this manner are depicted as dashed lines in FIG. 1B. The magnitude of the force of a magnetic field generated by one or more magnetic coils 50 is determined by the current, the number of winds of one or more magnetic coils 50, the area of one or more magnetic coil sections 51-59, and a number of other factors.

It is further contemplated herein that magnetic coil field generator 42 may electrically activate magnetic coils 50, including magnetic coil sections 51-59 in a timed rotation or sequence to generate a rotating space based electromagnetic vortex field MF2 therein space based magnetic vortex accelerator system 10 as depicted as dashed lines in FIG. 1C.

It is still further contemplated herein that magnetic coil field generator 42 may electrically activate magnetic coils 50, including magnetic coil sections 51-59 mechanically rotating R (rotates, rotational direction around end supports, such as first end support 61 and spaced there apart second end support 62) circularly therearound circumference C of space based magnetic vortex accelerator system 10 to generate rotating electromagnetic vortex field MF2 therein space based magnetic vortex accelerator system 10 as depicted as dashed lines in FIG. 1C.

It is further contemplated herein that magnetic coil field generator 42 and one or more magnetic coils 50 may be utilized to generate a positive or negative rotating or roll torque superimposed on the basic magnetic field that produces forward vehicle thrust for dynamic roll stability along longitudinal central axis to guided spacecraft 200 along the precise center line CL of one or more magnetic coils 50 configured substantially as a conduit.

Space based magnetic vortex accelerator system 10 may further include communication and navigation guidance system 43 having control circuitry with communication devices. Communication and navigation guidance system 43 may be configured having one or more lights (alignment beacons), such as beacons 20 including first beacon 21, second beacon 22, third beacon 23, and fourth beacon 24 for identifying ingress and egress thereto space based magnetic vortex accelerator system 10, such as first open end 11 and second open end 12. Moreover, communication and navigation guidance system 43 further includes one or more communication systems, such as antenna, dish or like systems to enable communication with space based magnetic vortex accelerator system 10. Furthermore, communication and navigation guidance system 43 further includes one or more accelerator positioning devices, such as thrusters 30 positioned thereabout space based magnetic vortex accelerator system 10 and more specifically proximate first open end 11 and second open end 12. One or more thrusters 30 may include first set, such as first thrusters 31, third thrusters 33, fifth thrusters 35, and seventh thrusters 37 positioned proximate first open end 11 to position first open end 11 and second set, such as second thrusters 32, fourth thrusters 34, sixth thrusters 36, and eighth thrusters 38 positioned proximate second open end 12 to position second open end 12.

It is contemplated herein that two or more directional thrusters 30, rotatable thereabout space based magnetic vortex accelerator system 10, may be utilized to position one or more magnetic coils 50 configured substantially as conduit for ingress and egress of a spacecraft and align one or more magnetic coils 50 configured substantially as conduit on a designated trajectory calculated and communicated thereto a spacecraft via communication and navigation guidance system 43.

Referring now to FIG. 1B, by way of example, and not limitation, there is illustrated an example space based magnetic vortex accelerator system 10 shown with spacecraft 200 travelling therethrough. Spacecraft 200 may be equipped with a plurality of magnetic propulsion devices, such as one or more booster coils 210 configured to generate spacecraft electromagnetic field and mounted proximate the circumferential periphery of spacecraft 200 fuselage with opposite magnetic orientation spacecraft electromagnetic force SMF (shown in FIG. 4), as to one or more magnetic coils 50 of space based magnetic vortex accelerator system 10 to magnetically engage or couple electromagnetic force MF1 or vortex electromagnetic force MF2 generated by one or more magnetic coils 50. Spacecraft 200 may be traveling in direction and velocity DV1 prior to entering space based magnetic vortex accelerator system 10 and when spacecraft 200 enters electromagnetic force MF1 or vortex electromagnetic force MF2, a force is applied to spacecraft 200 be electromagnetically propelled therethrough space by magnetic vortex accelerator system 10 via spacecraft electromagnetic force SMF, electromagnetic force MF1, and/or vortex electromagnetic force MF2 acting thereon spacecraft electromagnetic force SMF of booster coils 210 of spacecraft 200 and spacecraft 200 may be propelled and exit space based magnetic vortex accelerator system 10 accelerated and traveling in direction and velocity DV2. The magnitude of spacecraft electromagnetic force SMF, electromagnetic force MF1, or vortex electromagnetic force MF2 is derived from a calculation including the mass of spacecraft 200 and its starting direction and velocity DV1 and desired direction and velocity DV2 vectors.

It is contemplated herein that spacecraft 200 may approach space based magnetic vortex accelerator system 10, after long-distant confirmation, and pass through one or more magnetic coils 50, which will accelerate spacecraft 200 greatly due to magnitude of electromagnetic force MF1 or vortex electromagnetic force MF2 rotating fast circular motion, creating a magnetic vortex, pushing spacecraft 200 forward, in desired direction and accelerated velocity DV3 vectors.

Figure 2B:
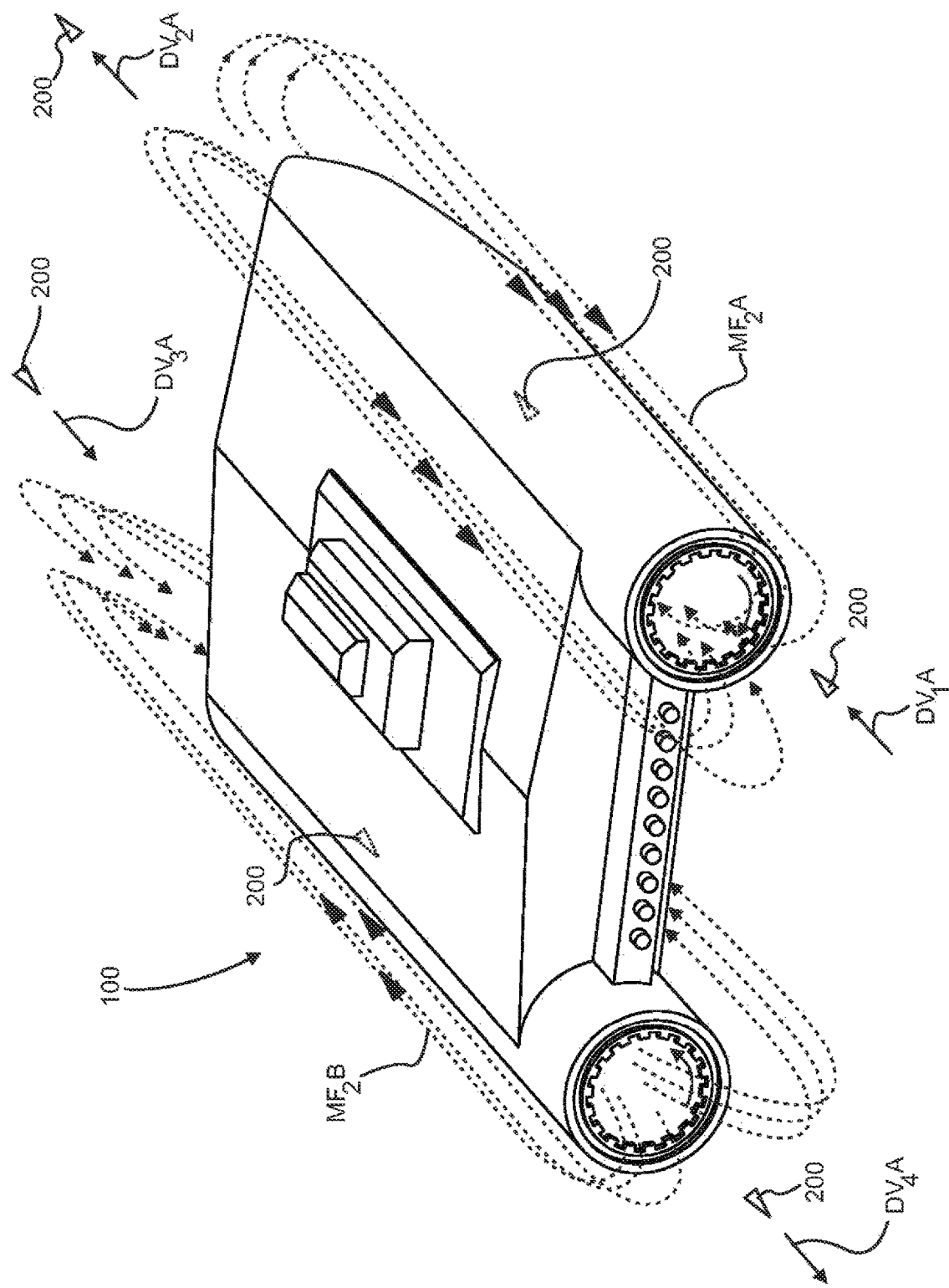
FIG. 2B is a rear perspective view of an exemplary embodiment of the dual direction space based magnetic vortex accelerator system showing lines of force of its magnetic field, according to FIG. 2.

Referring now to FIGS. 2A and 2B, by way of example, and not limitation, there is illustrated an example embodiment dual or two or more space based accelerator system 100. Dual space based accelerator system 100 may be configured as a dockable craft having structural components 150 utilized to support dual space based accelerator system 100, one or more body parts, such as exterior surfaces 140 to form exterior of dual space based accelerator system 100, one or more bays or modules, such as equipment/reactor module/coil generator 110 utilized for storage, transportation bays, and power and control system for dual space based accelerator system 100, habitat module 120 utilized for passenger living and housing station crew, workers quarters of dual space based accelerator system 100, and operations/bridge 130 utilized for command, operation, control, and communication operations of dual space based accelerator system 100.

It is contemplated herein that dual space based accelerator system 100 may include any and all parts, features, systems referenced above in space based accelerator system 10.

Moreover, structural components 150 and one or more body parts, such as exterior surfaces 140 may be equipped with dual or one or more rotational magnetic coils 50, such as first rotating magnetic coils 50A, and second rotating magnetic coils 50B, configured substantially as two or more conduits therethrough dual space based accelerator system 100.

Furthermore, structural components 150 and one or more body parts, such as exterior surfaces 140 may be equipped with thrust mechanisms 160 configured to position and move dual space based accelerator system 100 in space.

Referring now to FIG. 2B, by way of example, and not limitation, there is illustrated an example dual space based accelerator system 100 shown with spacecraft 200 travelling therethrough in opposite directions. For example, spacecraft 200 may be equipped with a plurality of magnetic devices, such as booster coils 210 mounted proximate circumferential periphery of spacecraft 200 fuselage with opposite, as in ninety degree configuration to generate spacecraft electromagnetic force SMF and to engage electromagnetic force MF2A generated by one or more rotating magnetic coils 50A. Spacecraft 100 may be traveling in direction and velocity DV1A prior to entering dual space based accelerator system 100 and be electromagnetically propelled therethrough dual space based accelerator system 100 via spacecraft electromagnetic force SMF and/or electromagnetic force MF2A acting thereon booster coils 210 of spacecraft 200 and spacecraft 200 may exit dual space based accelerator system 100 accelerated and traveling in direction and velocity DV2A. The magnitude of electromagnetic force MF2A is derived from a calculation including the mass of spacecraft 200 and its starting direction and velocity DV1A and desired direction and velocity DV2A vectors.

Alternatively, spacecraft 200 may be equipped with a plurality of booster coils 210 extending along its fuselage to generate spacecraft electromagnetic force SMF to engage electromagnetic force MF2B generated by one or more rotating magnetic coils 50B. Spacecraft 200 may be traveling in direction and velocity DV3A prior to entering dual space based accelerator system 100 and be electromagnetically propelled therethrough dual space based accelerator system 100 via spacecraft electromagnetic force SMF and/or electromagnetic force MF2B acting thereon booster coils 210 of spacecraft 200B and spacecraft 200B may exit dual space based accelerator system 100 accelerated and traveling in direction and velocity DV4A. The magnitude and direction of electromagnetic force MF2B is derived from a calculation including the mass of spacecraft 200B and its starting direction and velocity DV3A and desired direction and velocity DV4A vectors.

One turning clockwise, electromagnetic force MF2A for the Y+ direction, the other turning counter-clockwise, electromagnetic force MF2B for the Y− opposite direction of travel.

It is further contemplated herein that magnetic coil field generator 42 may electrically activate magnetic coils 50, including magnetic coil sections 51-59 in a timed rotational or sequence to generate rotating electromagnetic vortex field MF2A/MF2B therein space based magnetic vortex accelerator system 10 as depicted as dashed lines in FIG. 1C.

It is still further contemplated herein that magnetic coil field generator 42 may electrically activate magnetic coils 50, including magnetic coil sections 51-59 mechanically rotating R (rotational direction around end supports, such as first end support 61 and spaced there apart second end support 62) circularly therearound circumference C of space based magnetic vortex accelerator system 10 to generate rotating electromagnetic vortex field MF2A/MF2B therein space based magnetic vortex accelerator system 10 as depicted as dashed lines in FIG. 1C.

It is further contemplated herein that magnetic coil field generator 42 and one or more magnetic coils 50 may be utilized to generate a positive or negative roll or rotating torque superimposed on the basic magnetic field that produces forward vehicle thrust for dynamic roll stability along longitudinal central axis is guided along the precise center line CL of one or more magnetic coils 50 configured substantially as a conduit.

Figure 3:
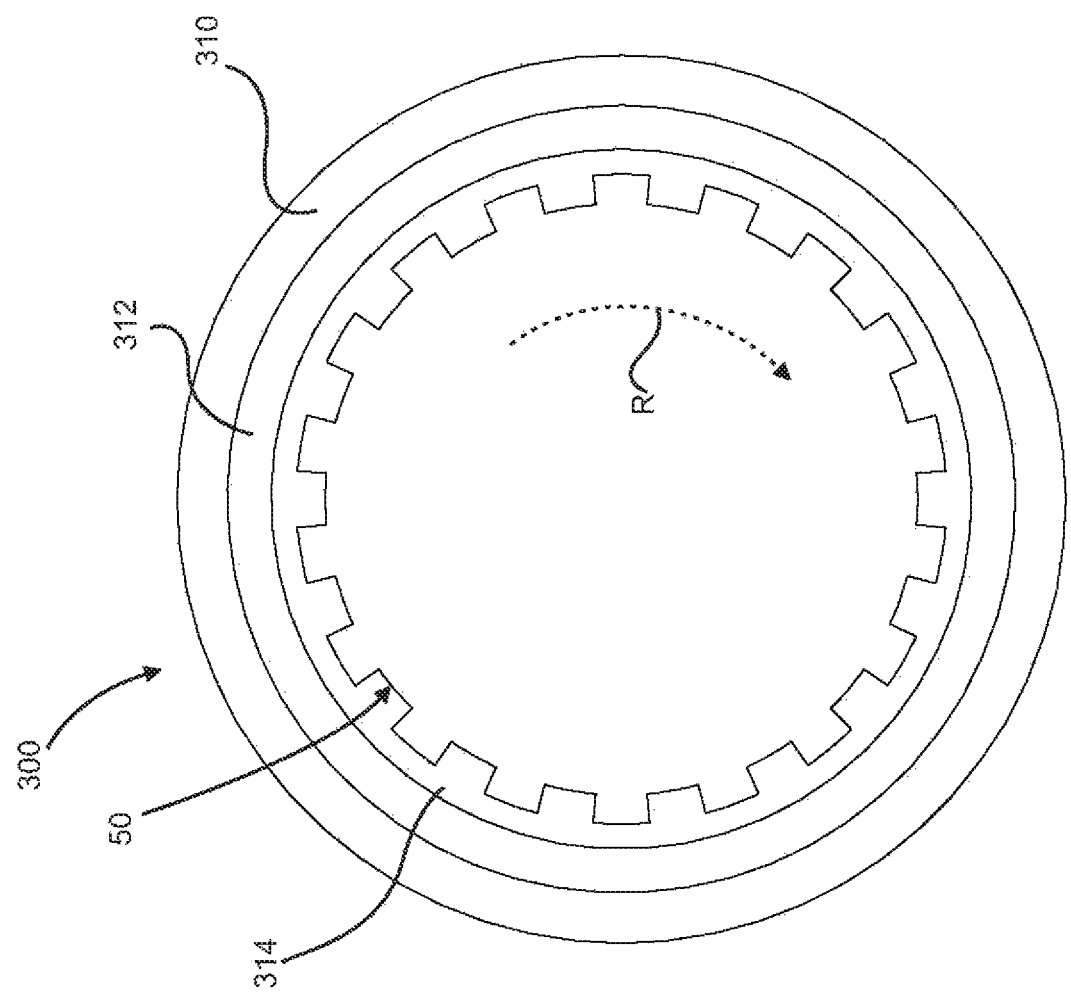
FIG. 3 is a cross sectional side view of an exemplary embodiment of tower interior exposing motorized cable lift and attachment device, according to FIG. 1 or 2.

Referring now to FIG. 3, by way of example, and not limitation, there is illustrated an example schematic transverse cross section view of space based magnetic vortex accelerator system 10/10A/10B, such as rotating magnetic vortex device 300. Rotating magnetic vortex device 300 may include inner support structure 312 supported thereby outer support structure 310. Preferably, inner structure 312 may be utilized to support rotating magnetic structure 314. Rotating magnetic structure 314 may be configured with one of one or more magnetic coils 50 positioned therearound circumference C or mounted around its external circumferential periphery C of rotating magnetic structure 314 inducing a directional magnetic field, such as rotating electromagnetic force MF2A and electromagnetic force MF2B therein space based magnetic vortex accelerator system 10A/10B as depicted as dashed lines in FIG. 1C.

It is further contemplated herein that magnetic coil field generator 42 may electrically activate rotating magnetic coils 50A/50B, including magnetic coil sections 51-59 mechanically rotating R (rotational direction around end supports), in a rotational circumference manner to generate rotating electromagnetic vortex field MF2A/MF2B therein space based magnetic vortex accelerator system 10A/10B as depicted as dashed lines in FIG. 1C. Likewise for spacecraft electromagnetic force SMF thereon spacecraft 200.

Figure 4A:
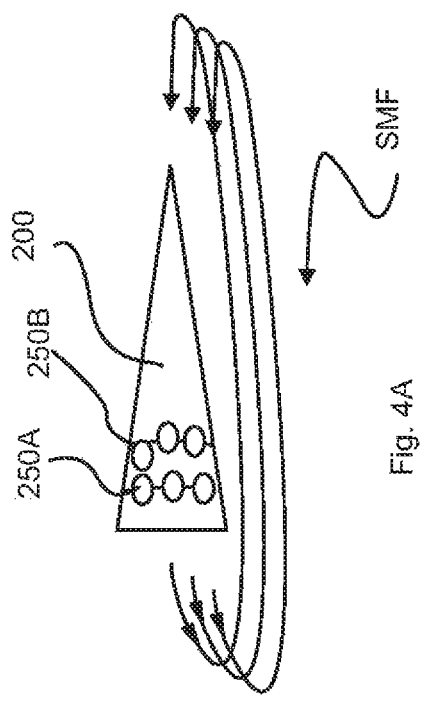
FIG. 4A is a side view of an exemplary embodiment of spacecraft generating a spacecraft's electromagnetic field.
Figure 4B:
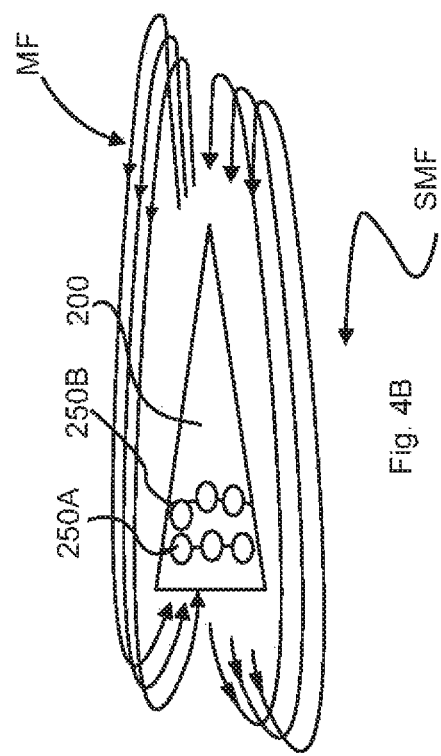
FIG. 4B is a side view of an exemplary embodiment of spacecraft generating a spacecraft's electromagnetic field and under the combinational influence space based magnetic vortex accelerator electromagnetic field.

Referring now to FIGS. 4A and 4B, by way of example, and not limitation, there is illustrated an example side view of spacecraft 200. Spacecraft 200 may include booster coils 210 formed as opposite configured (rotating) magnetic coils 250A/250B to generate rotating spacecraft based electromagnetic vortex field SMF therearound spacecraft 200 approximately ninety (90) degrees opposed or otherwise opposing electromagnetic field configured opposite electromagnetic vortex field MF2A/MF2B. Electromagnetic vortex field MF2A/MF2B in combination with spacecraft's 200 electromagnetic field SMF (one pushing against the other, adding to the other, or magnetically couples, coupled one to the other), while traveling through space based magnetic vortex accelerator system 10A/10B, will accelerate spacecraft 200 pushing spacecraft 200 forward or with extremely faster velocities via additional force of spacecraft's 200 electromagnetic field SMF.

It is contemplated herein that spacecraft 200 may have similar systems as set forth in FIGS. 1-3 on board to generate a spacecraft's 200 electromagnetic vortex field as spacecraft's 200 electromagnetic field SMF.

Figure 5:
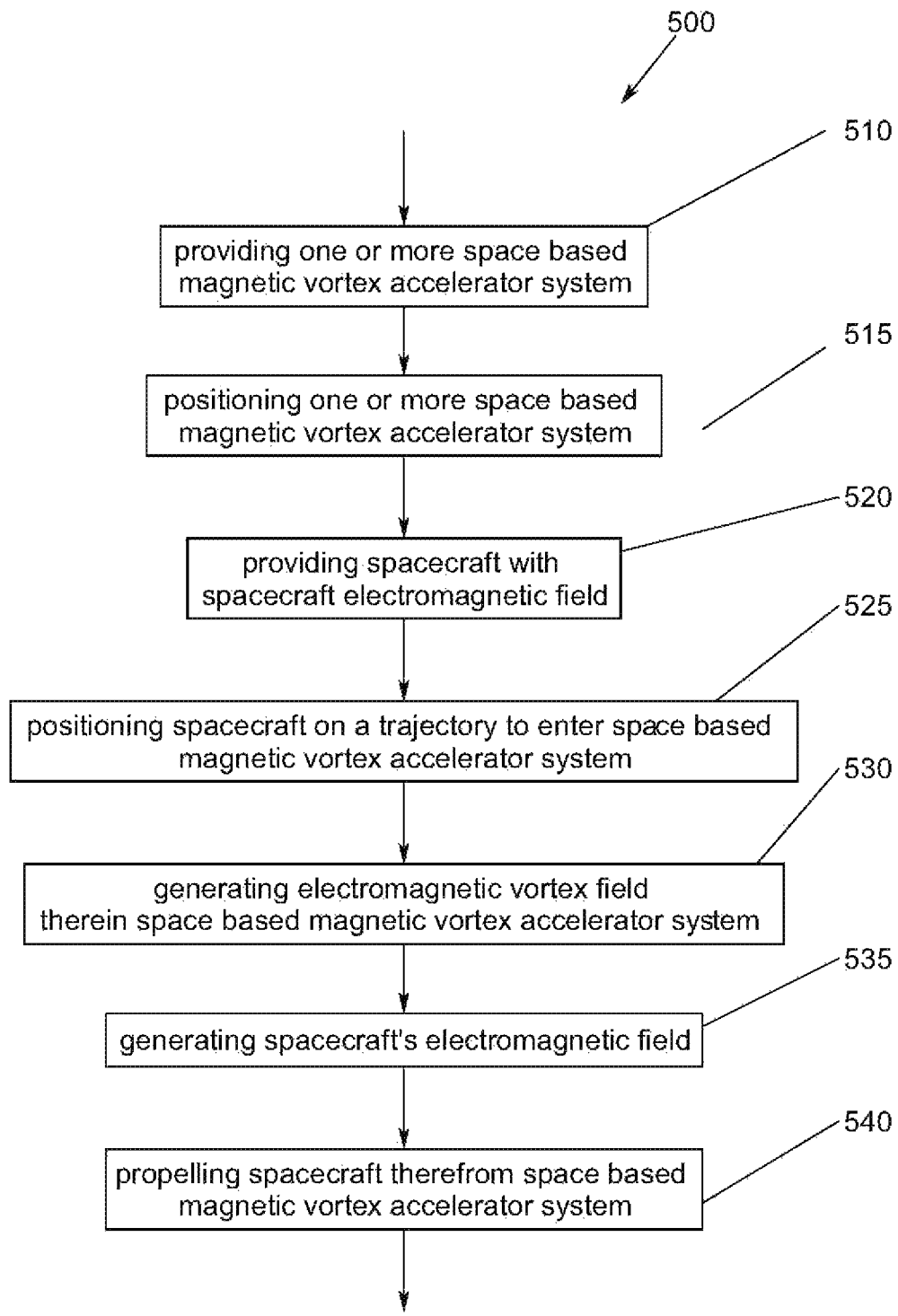
FIG. 5 is a flow diagram of a method of propelling spacecraft therethrough space based magnetic vortex accelerator.

Referring now to FIG. 5, there is illustrated a flow diagram 500 of a method of use of space based magnetic vortex accelerator system 10 to propel spacecraft 200B in space as shown in FIGS. 1-4. In block or step 510, providing one or more space based magnetic vortex accelerator system 10 configured to propel spacecraft 200B in space via electromagnetic vortex field, electromagnetic vortex field MF2A/MF2B. In block or step 515, positioning one or more space based magnetic vortex accelerator system 10. In block or step 520, providing spacecraft 200 with spacecraft's 200 electromagnetic field SMF generator or accelerator. In block or step 525, positioning spacecraft 200 on a trajectory to enter space based magnetic vortex accelerator system 10 proximate end supports, such as first end support 61 and spaced there apart second end support 62. In block or step 530, generating electromagnetic vortex field MF2A/MF2B therein space based magnetic vortex accelerator system 10A/10B. In block or step 535, generating spacecraft's 200 electromagnetic field SMF. In block or step 540, propelling spacecraft 200 therefrom space based magnetic vortex accelerator system 10A/10B in a desired direction and accelerated velocity DV vector.

It is contemplated herein that one or more space based magnetic vortex accelerator system 10 may be utilized to accelerate or decelerate spacecraft 200.

It is further contemplated herein that two or more space based magnetic vortex accelerator system 10 may be configured to synchronize and tune to each other and combine electromagnetic vortex fields MF2A/MF2B and positioned in series together for generating additional force or combined electromagnetic forces from multiple electromagnetic vortex field MF2A/MF2B to accelerate or decelerate spacecraft 200 and propel spacecraft 200 faster.

The foregoing description and drawings comprise illustrative embodiments of the present disclosure. Having thus described exemplary embodiments, it should be noted by those ordinarily skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments of the disclosure will come to mind to one ordinarily skilled in the art to which this disclosure pertains having the benefit of the teachings presented in the foregoing descriptions and the associated drawings. Although specific terms may be employed herein, they are used in a generic and descriptive sense only and not for purposes of limitation. Moreover, the present disclosure has been described in detail, it should be understood that various changes, substitutions and alterations can be made thereto without departing from the spirit and scope of the disclosure as defined by the appended claims. Accordingly, the present disclosure is not limited to the specific embodiments illustrated herein, but is limited only by the following claims.

What is claimed is:

1. A space based system to accelerate or de-accelerate a spacecraft in space, said system comprising:
    one or more sections of magnetic coils configured as a conduit with a flightpath therethrough for the spacecraft, said one or more sections of magnetic coils rotates in a circumference therein said conduit to generate a rotating space based electromagnetic vortex field therein said flightpath;
    a magnetic coil field generator electrically connected to said one or more sections of magnetic coils and configured to generate a space based magnetic field therein said flightpath;
    a power plant electrically connected to said magnetic coil field generator, said power plant configured to power said magnetic coil field generator; and
    one or more booster coils affixed to the spacecraft, said one or more booster coils configured to generate a rotating spacecraft based electromagnetic vortex field therearound the spacecraft to interact with said rotating space based electromagnetic vortex field.

2. The system of claim 1, wherein said magnetic coil field generator electrifies said one or more sections of magnetic coils in a rotation to generate a rotating space based electromagnetic vortex field therein said flightpath.

3. The system of claim 1, further comprises an alignment beacon.

4. The system of claim 1, further comprises a navigation guidance system.

5. The system of claim 1, further comprises one or more thrusters configured to position said one or more sections of magnetic coils in in said flightpath.

6. The system of claim 1, further comprises two or more space based accelerator systems are positioned in series.

7. The system of claim 6, wherein said two or more space based accelerator systems are configured to tune to each other to generate combined electromagnetic forces.

8. The system of claim 1, wherein said rotating spacecraft based electromagnetic vortex field therearound the spacecraft interacts with said rotating space based electromagnetic vortex field provides a dynamic roll stability or the spacecraft.

9. The system of claim 1, further comprises two or more conduits, each said two or more conduits with a flightpath therethrough for the spacecraft.

10. The system of claim 1, further comprises one or more space based de-accelerator systems are positioned in series.

11. The method of utilizing a space based system to accelerate or de-accelerate a spacecraft in space, said method comprising the steps of:
   providing one or more sections of magnetic coils configured as a conduit with a flightpath therethrough for the spacecraft, said one or more sections of magnetic coils rotates in a circumference therein said conduit to generate a rotating space based electromagnetic vortex field therein said flightpath, a magnetic coil field generator electrically connected to said one or more sections of magnetic coils and configured to generate a space based magnetic field therein said flightpath, a power plant electrically connected to said magnetic coil field generator, said power plant configured to power said magnetic coil field generator; one or more booster coils affixed to the spacecraft, said one or more booster coils configured to generate a rotating spacecraft based electromagnetic vortex field therearound the spacecraft to interact with said rotating space based electromagnetic vortex field;
   positioning said one or more sections of magnetic coils configured as a conduit in said flightpath of the spacecraft;
   positioning the spacecraft on a trajectory to enter said one or more sections of magnetic coils configured as a conduit;
   generating an electromagnetic vortex field therein said one or more sections of magnetic coils configured as a conduit; and
   generating a rotating spacecraft based electromagnetic vortex field therearound the spacecraft; and
   propelling the spacecraft therefrom said one or more sections of magnetic coils configured as a conduit.

12. The method of claim 11, further comprises the step of accelerating the spacecraft therefrom said one or more sections of magnetic coils configured as a conduit.

13. The method of claim 11, further comprises the step of de-accelerating the spacecraft therefrom said one or more sections of magnetic coils configured as a conduit.

* * * * *